Aug. 23, 1949.  J. L. BROWN  2,479,723
METHOD AND MEANS FOR ALIGNING THE REAR
AXLES OF TRAILERS AND THE LIKE
Filed July 20, 1948   2 Sheets-Sheet 1

INVENTOR.
JOSEPH L. BROWN
BY *Parrott and Richards*

ATTORNEYS

Aug. 23, 1949.　　　　J. L. BROWN　　　　2,479,723
METHOD AND MEANS FOR ALIGNING THE REAR
AXLES OF TRAILERS AND THE LIKE
Filed July 20, 1948　　　　　　　　　2 Sheets-Sheet 2
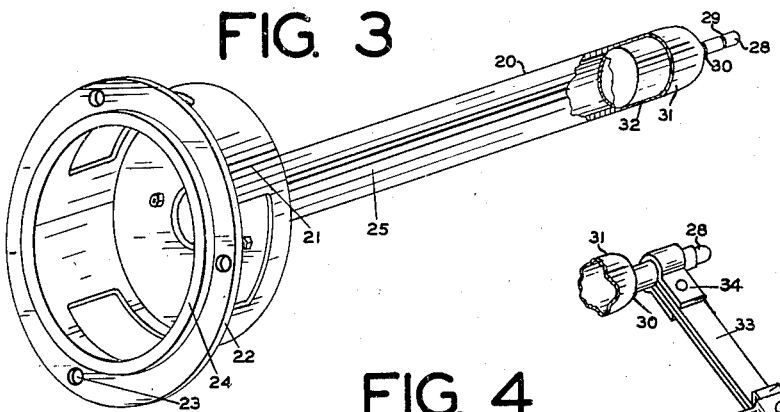
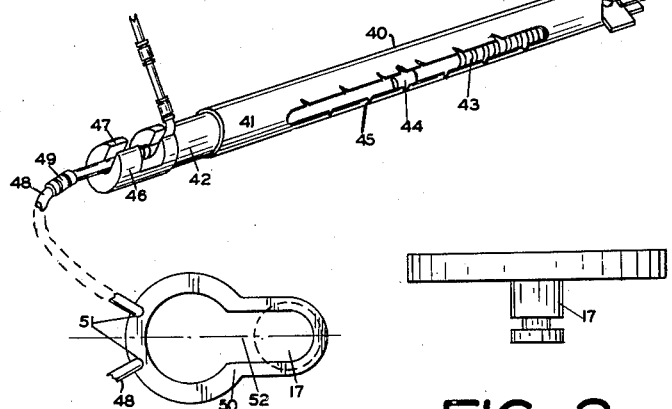
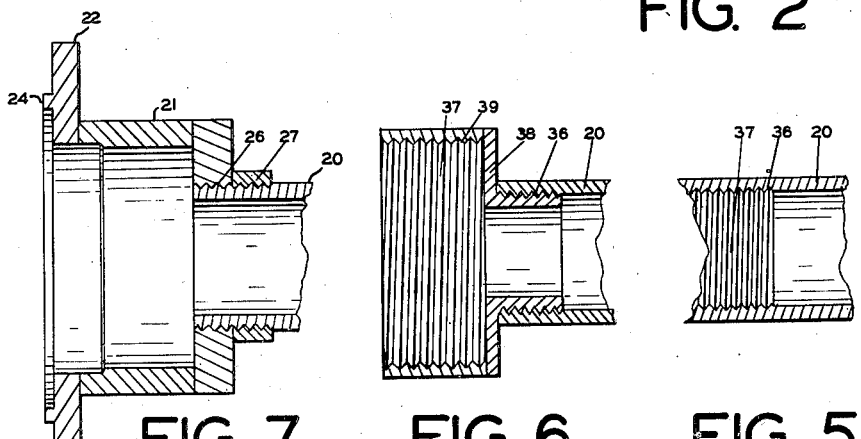
INVENTOR.
JOSEPH L. BROWN
BY *Parrott and Richards*
ATTORNEYS Patented Aug. 23, 1949

2,479,723

UNITED STATES PATENT OFFICE 2,479,723

METHOD AND MEANS FOR ALIGNING THE REAR AXLES OF TRAILERS AND THE LIKE

Joseph L. Brown, Charlotte, N. C.

Application July 20, 1948, Serial No. 39,793

11 Claims. (Cl. 33—193)

This invention relates to a method and means for aligning vehicle axles, and more particularly to a method and means which can be utilized for this purpose without extensive disassembly of the wheel assembly and without requiring skilled mechanics.

One of the most burdensome maintenance problems in the use of trailers by motor lines and the like is the matter of keeping the rear axles of the trailers in proper alignment. If this alignment is not maintained, the trailer will run out of line with the tractor pulling it, which not only results in undue wear on the tires, but makes driving difficult and creates a serious safety hazard.

In order to make this alignment by methods heretofore commonly employed, it is necessary to remove the rear wheel assemblies from the axle so that the axle spindles may be reached as reference points for the alignment. This method is unsatisfactory because removal of the wheel assemblies is a major maintenance job and requires repacking of the wheel assemblies when they are replaced so that the alignment is quite expensive. On the other hand, it is not possible to maintain the alignment over any extended period when the trailer is in use so that it should be checked and adjusted frequently.

According to the present invention axle extenders or adapters are arranged for mounting at each end of the rear axle of a trailer so as to establish reference points aligned with the axle and extending in a length sufficient to provide a traverse clear of the wheel assemblies mounted on the axle from these reference points to a central reference point adjacent the forward end of the trailer, such as the kingpin. Distance measuring means may then be used to compare the distances from the central reference point to each of the reference points provided on the adapters, and the axle hanger structure may be easily adjusted in the usual manner until these distances are equal to effect the alignment.

In addition to the fact that the axle alignment may be carried out according to the present invention without taking down the rear wheel assemblies so that any ordinary shop hand may easily make the alignment, the present invention has the further important advantage of allowing the alignment to be made with the trailer loaded which assures proper alignment under actual conditions of use.

These and other advantages of the present invention are pointed out further in the following detailed description of the invention in connnection with the accompanying drawings, in which:

Fig. 2 is a detail side elevational view of a kingpin normally forming a part of the coupling assembly (not shown) of a trailer;

Fig. 3 is a perspective view of an adapter according to one form of the invention;

Fig. 4 is a perspective view showing a tension measuring scale mounted at the outer end of the adapter and connected to a tension cable, which is in turn connected to a plate or collar adapted for assembly with the kingpin;

Fig. 5 is a fragmentary cross-sectional view showing an axle extender of the type shown in Fig. 3 but mounted directly on the end of the axle spindle by screw threads;

Fig. 6 is a fragmentary cross-sectional view showing an adapter mounted between the axle spindle and the axle extender shown in Fig. 5, and Fig. 7 is a fragmentary perspective view showing a modified form of adapter illustrated in Fig. 3.

Figure 1:
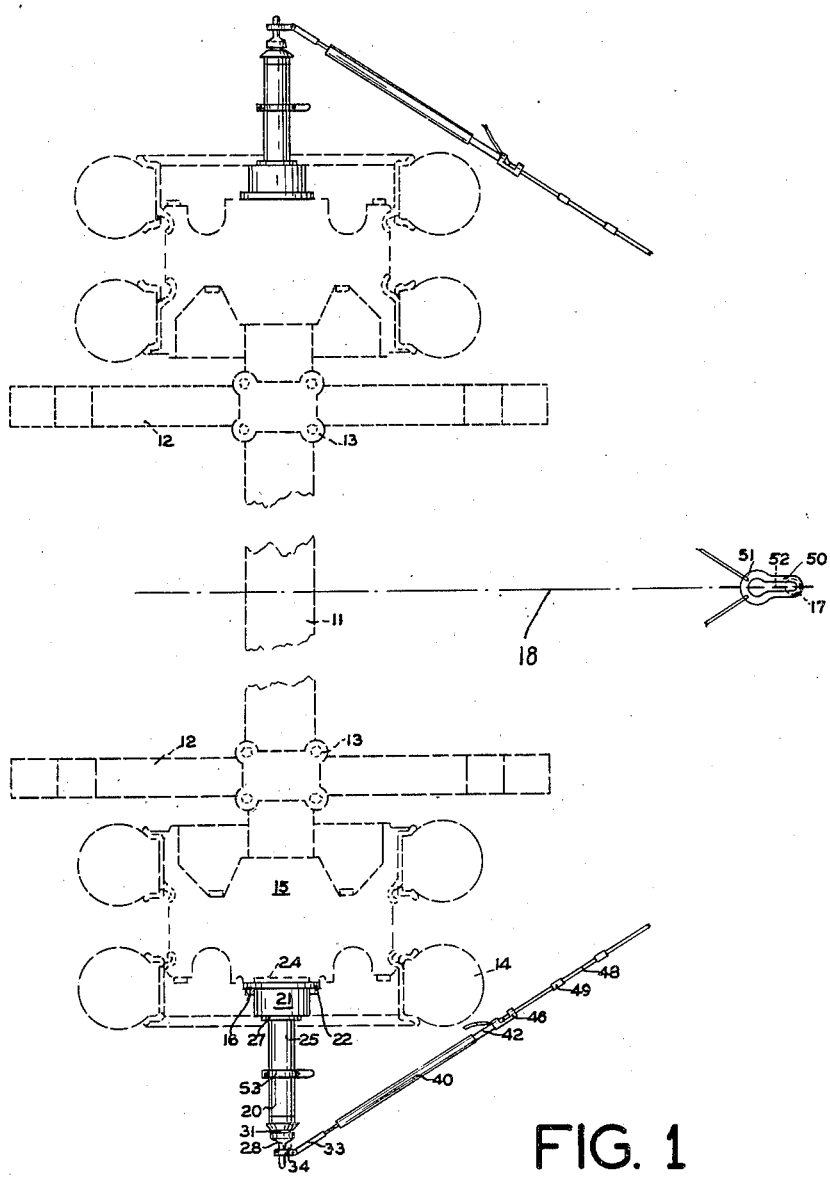
Fig. 1 is a schematic plan view taken below the flooring and supporting framework of a trailer, showing generally the manner of using the invention.

In the embodiments of the present invention as shown in the drawings, there is illustrated in Figs. 1 and 2 the running gear of a trailer and the kingpin of the usual coupling assembly (not shown). The running gear of a trailer as commonly arranged comprises an axle 11 which is mounted in a suitable hanger structure under a set of springs 12 by means of connectors 13. In the usual case, dual rear wheel assemblies 14 are mounted on the axle 11 by wheel mounts indicated generally at 15 which are provided at their outer faces around a bore housing the bearing securing nuts at the end of axle 11, with hub cap bolt holes into which hub cap bolts 16 are normally threaded to secure the hub caps in place. The opposite and forward end of the trailer is normally provided with a coupling assembly (not shown) including a kingpin 17 which is mounted on the longitudinal axis 18 of the trailer, and at which the trailer is coupled with the tractor used to pull it.

The axle extender or adapter 20 of the present invention may take the form shown in Figs. 1, 3 and 7, in which it comprises a cup-shaped base portion 21 provided with a lateral flange 22 having suitably spaced bolt holes or mounting apertures 23 registering with the hub cap mounting bolts 16, so that the adapter 20 may be mounted at the end of the axle 11 by merely removing the hub cap and securing the base portion 21 on the wheel mount 15 with the hub cap bolts 16. The base portion 21 is further formed with an annular flange 24 fitting the above mentioned bore at the hub of the wheel mount 15. As this bore houses the bearing and securing nuts at the end of the axle 11, it is a machined surface in relation to which the adapter 20 may be accurately aligned with the axle 11. Alternatively, the adapter 20 may be internally threaded as indicated in Fig. 5 at 36 for threading directly on the axle spindle 37 when the axle nuts are removed.

The adapter 20 further comprises a tubular extending arm portion 25 which may be secured to the base portion 21 in any convenient manner, such as by screw threads as shown at 26 in Fig. 7. The arrangement of screw threads 26 may be supplemented with an abutment collar 27 to adapt the arm portion 25 for assembly readily with any base portion 21 of a set provided for selective use with varying types of wheel mounts 15 as explained further below. Similarly an adapter 20 of the type illustrated in Fig. 5 may be arranged for threaded engagement at 36 with any of a set of base portions 38 which are in turn internally threaded as at 39 for engagement with varying sizes of axle spindles 37.

The extending arm portion 25 is formed at its extending end to establish a reference point for use with distance measuring means. For this purpose, a pin 28 formed with a groove 29 to receive and position the loop or ring commonly provided at the end of the ordinary measuring tape may be arranged on the arm portion 25. As shown in Fig. 3, the pin 28 may be formed with a screw threaded shank or the like (not shown) for assembly as indicated at 30 with a plug member 31 adapted for a press fit in the extending end of the arm portion 25 as shown at 32.

It should also be particularly noted that, as illustrated in Fig. 1, the extending arm portion 25 is formed in a length sufficient to dispose the pin 28 when the adapter 20 is mounted at the end of the axle 11 so that a traverse clear of the wheel assembly 14 is provided for distance measuring means from the groove 29 or other reference point on the pin 28 to the central reference point provided adjacent the forward end of the trailer by the kingpin 17. It will be seen that this affords a simple and convenient means for making the necessary measurements to align the axle 11.

The extending arm portion 25 may be also provided with a tension measuring scale to further facilitate the alignment operation if desired. An arrangement of this sort is illustrated in Figs. 1 and 4, in which the pin 28 at the extending end of the arm portion 25 is fitted with a bracket bar 33 by means of a clamp 34, the other end of the bracket bar 33 being adapted as shown at 35 to support pivotally a tension measuring scale 40. This tension measuring scale 40 in the embodiment shown, comprises an outer tube or sheath 41 into which is telescoped an inner rod or tube 42 which is attached at its inner end to a spring 43 or other suitable tension means. An index indicator 44 is mounted on the inner rod for travel along a suitably calibrated slot 45 to indicate measurements recorded by the measuring scale 40.

The inner rod 42 is provided at its outer end with a suitable line or cord holding member 46, which, as shown, comprises a set of jaws or slots 47. The particular tape or line holding means 46 shown is especially adapted for use with a wire rope line 48 provided with pressed beads 49, the slots being so adjusted as to permit passage of the cable 48 but prevent passage of the bead 49. The other end of cord member 48 from a pair of adapters 20 is attached to a reference plate or collar 50 formed for assembly on the kingpin 17 as indicated in Fig. 4, the pressed beads 49 being spaced on the cord members 48 at equal lengths from the reference plate 50 so that balanced readings of the measuring scales 40 will indicate alignment of the axle 11 from the center line as at 52 of the trailer.

In utilizing the method and means of the present invention for aligning the rear axle of a trailer it is only necessary to remove the hub cap bolts 16 and hub cap of the running gear on the axle 11 of which it is desired to determine and correct the alignment. After the hub cap bolts 16 have been removed from the wheel mounts 15, the axle extenders 20 are either bolted onto the wheel mounts at their flange portions 22 by means of the hub cap bolts 16, or screwed directly onto the axle spindles 37 after removing the axle nuts, thereby positioning the axle extenders 20 in accurate extended alignment with the longitudinal axis of the axle 11. After the axle extenders 20 have been secured at the ends of the axle 11, the pins 28 at the extending ends of the arm portions 25 will be disposed, as previously mentioned, to provide a traverse clear of the wheel assemblies 14 to a central reference point adjacent the forward end of the trailer, such as the kingpin 17.

In making the alignment, any ordinary distance measuring means, such as a steel measuring tape, may be used with an adapter 20 arranged as shown in Fig. 3, the tape being extended in succession from the pin 28 of each adapter 20 to compare the respective distances to the kingpin 17, following which the hanger structure for the axle 11 may be adjusted as indicated by the means conventionally provided for this purpose.

The aligning operation is facilitated, however, by using adapter 20 fitted with measuring scales 40 as shown in Fig. 4 and described above. In using adapter 20 arranged in this manner, the cord members 48 are attached to the measuring scales 40 at corresponding beads 49 after the adapters 20 have been mounted at the ends of the axle 11, and the reference plate 50 is then assembled with the kingpin 17 to extend the cord members 48 under tension from each of the measuring scales 40. This tension in the cord members 48 results in extension of the rod member 42 against the pull of the springs 43 in the scales 40, and as the beads 49 are fixed on the cord members 48 at equal lengths from the reference plate 50, the readings indicated by the index 44 of each measuring scale 40 should correspond with each other if the axle 11 is in alignment. If the readings do not correspond, the necessary adjustment of the axle hanger structure may be made as previously described.

The above described means for aligning axles has been found of particular utility when assembled in the form of a kit so as to be maintained conveniently available for use. In this connection, where adapters 20 incorporating measuring scales 40 are provided, it has proved advantageous to arrange a clamp 53 on the arm portion 25 for holding the measuring scale 40 when not in use. A suitable kit provided for use according to the present invention would comprise at least one pair of extension devices or adapters 20, provided if desired with measuring scales 40, cord members 48 and a reference plate 50, and preferably also with a set of base portions 21, or 37, for selective use with the several varieties of wheel assemblies with which trailers and the like are commonly equipped.

I claim:

1. A method of aligning the rear axles of trailers and the like by which the alignment may be made with the trailer loaded and without taking down the rear wheel assemblies, which comprises mounting extending members of equal length at each end of the rear axle of a trailer and in a length sufficient to establish reference points at their extending ends providing a traverse clear of the wheel assemblies on said axle to a central reference point adjacent the forward end of said trailer, measuring and comparing the distances from the ends of said extending members to said central reference point, and adjusting the axle hanger structure and rechecking and comparing measurements until these distances are equal.

2. A method of aligning the rear axles of trailers and the like by which the alignment may be made with the trailer loaded and without taking down the rear wheel assemblies, which comprises mounting extending members of equal length at each end of the rear axle of a trailer in alignment with said axle and in a length sufficient to establish reference points at the extending ends of said extending members providing a traverse clear of the wheel assemblies on said axle to the kingpin of said trailer, measuring and comparing the distances from the ends of said extending members to said kingpin, and adjusting the axle hanger structure and rechecking and comparing measurements until these distances are equal.

3. A kit for aligning the rear axles of trailers and the like and with which the alignment may be made with the trailer loaded and without taking down the rear wheel assemblies, said kit comprising a pair of extension devices adapted at one end for mounting at each end of the rear axle of a trailer in alignment with said axle, said extension devices being further adapted for forming reference points at their other extending ends for use with distance measuring means, and said extension devices being formed in a length sufficient to dispose said reference points so that a traverse clear of the wheel assemblies on said axle is provided for said distance measuring means from said reference points to a central reference point adjacent the forward end of said trailer, such as the kingpin.

4. A kit for aligning the rear axles of trailers and the like and with which the alignment may be made with the trailer loaded and without taking down the rear wheel assemblies, said kit comprising a pair of extension devices adapted at one end for mounting at each end of the rear axle of a trailer and having spring loaded scale members connected at their other extending ends, cord members adapted at one end for connection with said scale members for actuation thereof, and a reference plate formed for assembly on the kingpin of said trailer and fixed to the other ends of said cord members, said extension devices being formed in a length sufficient to provide a traverse clear of the wheel assemblies on said axle for extending said cord members under tension from said scale members to said reference plate.

5. A kit for aligning the rear axles of trailers and the like and with which the alignment may be made with the trailer loaded and without taking down the rear wheel assemblies, said kit comprising a pair of extension devices adapted at one end for mounting at each end of the rear axle of a trailer and having spring loaded scale members connected at their outer extending ends, a reference plate formed for assembly on the kingpin of said trailer, and cord members fixed on said reference plate and adapted for extension and connection in equal lengths with said scale members for actuation thereof, said extension devices being formed in a length sufficient to provide a traverse clear of the wheel assemblies on said axle for extending said cord members under tension from said scale members to said reference plate.

6. An axle length extender for use with distance measuring means in determining the alignment of axles of trailers having hub caps attached to the wheel mounts by bolts, comprising an elongated member having a flanged, cup-shaped member provided with bolt holes on the flange stationed to match the position of the hub cap attaching bolts, and means on the other end of said member for engagement by said distance measuring means.

7. An axle length extender for use with distance measuring means in determining the alignment of axles of trailers having hub caps attached to the wheel mounts by bolts, comprising an elongated member having an adapter detachably mounted on one end of said member and provided with bolt holes stationed to match the position of the hub cap attaching bolts thereby permitting attachment of the extender to said wheel mounts by means of said hub cap attaching bolts, and means on the other end of said member for engagement by said distance measuring means.

8. A kit for determining the axle alignment of a trailer having hub caps attached to the wheel mounts by means of bolts and having a coupling assembly including a kingpin, comprising a pair of axle length extenders having an elongated body portion and a flanged end portion provided with bolt holes on the flange stationed to match the position of said hub cap attaching bolts, the other end portion being of reduced diameter, a collar member adapted to be secured to said kingpin, a pair of cord members attached to said collar at one end and provided at their other ends with a series of abutment members spaced equidistantly from said collar, spring loaded scale members pivotally attached at one end to the reduced end portion of said axle extenders and having holding means at the other end thereof for gripping said abutments, the aforesaid elements being cooperatively arranged to permit determination of the alignment of a trailer axle.

9. An extension device adapted for use in aligning the rear axles of trailers and the like and with which the alignment may be made with the trailer loaded and without removing the wheel assemblies, said extension device comprising a base portion and an extending arm portion, said base portion being adapted for mounting at an end of the rear axle of a trailer and accurately aligning said extending arm portion with said axle, and said extending arm portion being formed to provide a reference point at its extending end for use with distance measuring means and having a length sufficient to dispose said reference point so that when said extension device is mounted at the end of an axle a traverse clear of the wheel assembly on said axle is provided for said distance measuring means from said reference point to a central reference point adjacent the forward end of said trailer, such as the kingpin.

10. An extension device as defined in claim 9 and further characterized in that said base portion is formed with mounting apertures registering with the hub cap mounting bolts of the wheel assemblies for said trailer, whereby said extension device may be mounted at the end of said axle by said mounting bolts, and said base portion is further formed with an annular flange fitting the bore at the hub of said wheel assembly, whereby said extension device is accurately aligned with said axle.

11. An extension device as defined in claim 9 and further characterized in that said base portion is internally threaded for screwing on said axle upon removal of an axle nut.

JOSEPH L. BROWN.

REFERENCES CITED

The following references are of record in the file of this patent:

UNITED STATES PATENTS

| Number | Name | Date |
|---|---|---|
| 725,411 | Compliment et al. | Apr. 14, 1903 |
| 1,840,766 | Creagmile | Jan. 12, 1932 |
| 2,000,993 | Schmidt | May 14, 1935 |
| 2,275,137 | Friestedt | Mar. 3, 1942 |

FOREIGN PATENTS

| Number | Country | Date |
|---|---|---|
| 585,630 | Germany | Oct. 9, 1933 |